No. 756,381. PATENTED APR. 5, 1904.
R. S. LAWRENCE.
CARBURETER.
APPLICATION FILED JULY 13, 1903.
NO MODEL. 2 SHEETS—SHEET 1.
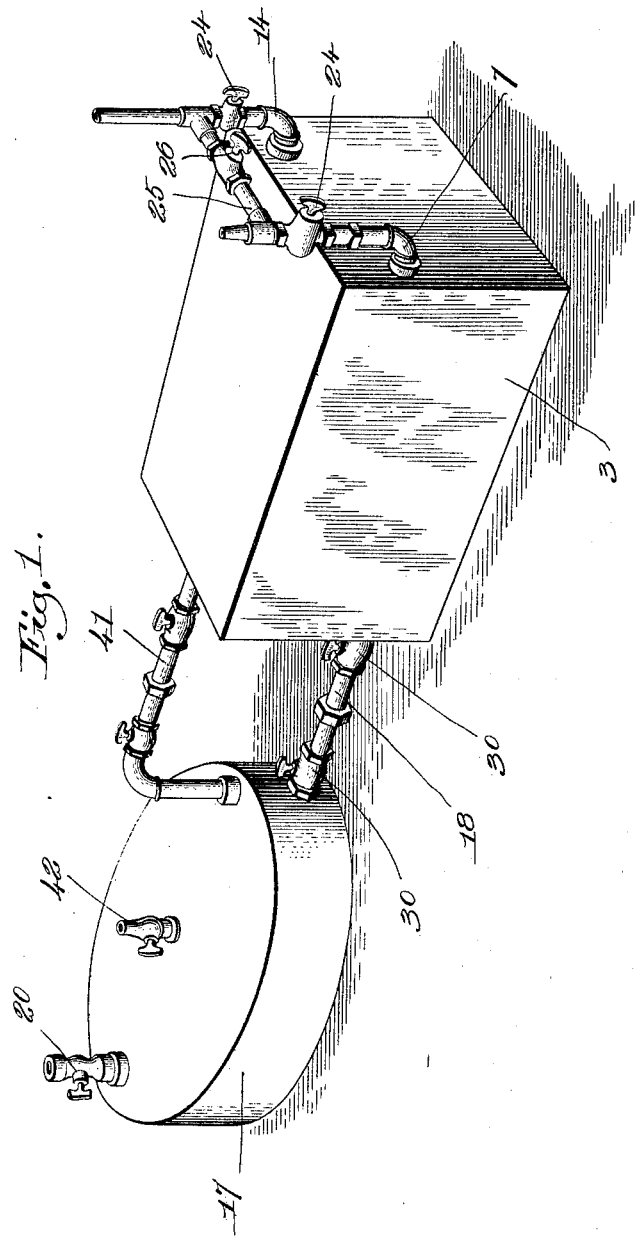

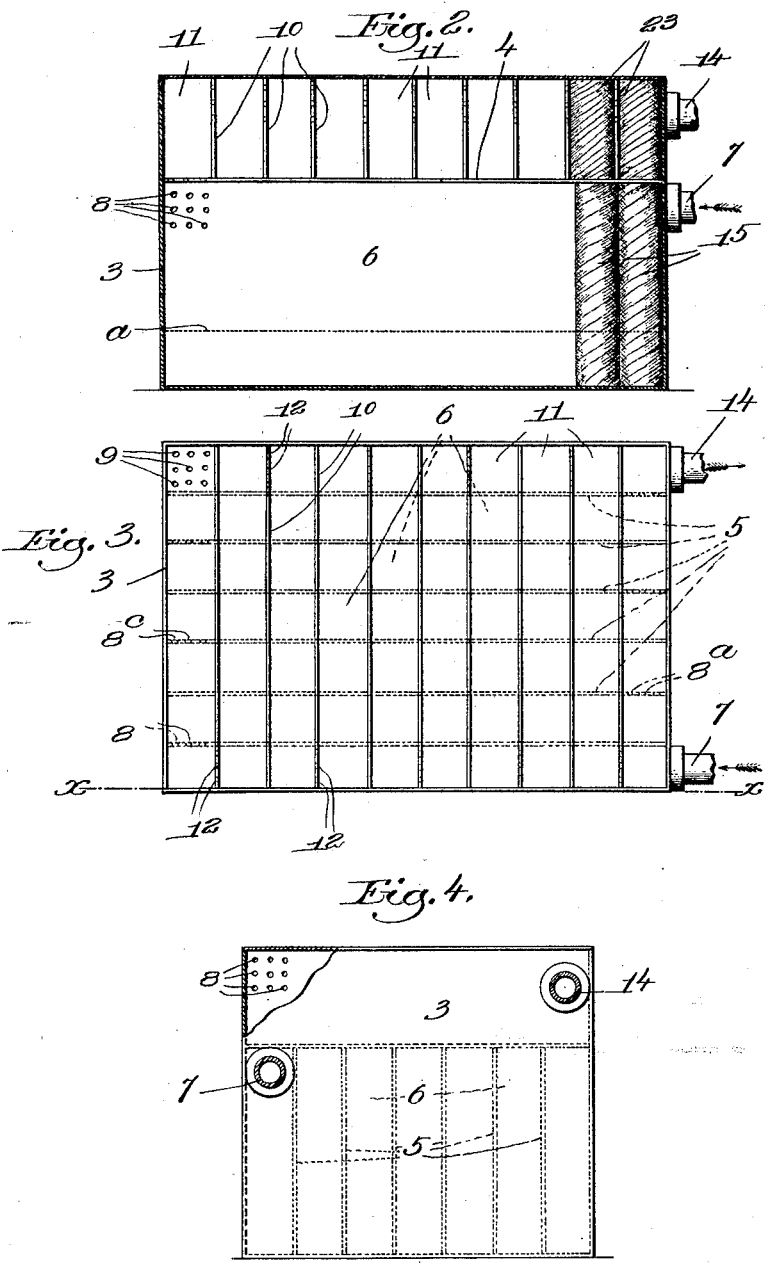

No. 756,381.                                                    Patented April 5, 1904.

UNITED STATES PATENT OFFICE.

ROBERT S. LAWRENCE, OF BOSTON, MASSACHUSETTS, ASSIGNOR TO MADISON M. MAKEEVER, OF BOSTON, MASSACHUSETTS.

CARBURETER.

SPECIFICATION forming part of Letters Patent No. 756,381, dated April 5, 1904.

Application filed July 13, 1903. Serial No. 165,231. (No model.)

*To all whom it may concern:*

Be it known that I, ROBERT S. LAWRENCE, a citizen of the United States, residing at Boston, in the county of Suffolk and State of Massachusetts, have invented an Improvement in Carbureters, of which the following description, in connection with the accompanying drawings, is a specification, like numerals on the drawings representing like parts.

This invention has for its object to provide a novel appliance by means of which gas may be treated and enriched for various purposes.

Among the uses to which my invention may be put are treating commercial illuminating-gas for the purpose of raising its candle-power, treating coal and water gases for the purpose of increasing the heat units therein, giving a greater heating power to natural gas, carbureting air, &c. I accomplish these objects by passing the gas to be treated through a chamber filled with some suitable absorbent material, to be presently described, which is saturated with a hydrocarbon oil, and subsequently taking said gas through a second chamber filled with a filtering material through which the gas passes and which has for its object to remove any surplus hydrocarbon from the gas, and thus prevent condensation of the gas in the pipes. The passage of the gas through the first chamber causes it to abstract from the absorbent material therein the necessary properties to give it the characteristics desired.

One apparatus embodying my invention is illustrated in the accompanying drawings and will now be described.

Figure 1 is a perspective view of one form of apparatus by which the above results can be accomplished. Fig. 2 is a section on the line $xx$, Fig. 3. Fig. 3 is a plan view of the casing with the top or cover removed, and Fig. 4 is an end elevation of said casing with one corner thereof broken out.

The two chambers in which the gas is treated are in this embodiment of my invention illustrated as being situated in the same receptacle or casing, this construction being adopted because of its simplicity and compactness. Said casing or receptacle is designated generally by 3 and in this form of the invention is divided by the partition 4 into two chambers. Each of the chambers is preferably cellular in construction, and the various cells are connected together successively, so that the gas in passing through each chamber has to pass through the various cells or compartments of the chamber in succession.

The lower chamber is divided by the partitions 5 into cells or compartments 6, which run from one end of the casing or chamber 3 to the other.

7 designates an inlet-pipe connected to the right-hand end of the lower cell or compartment 6, Fig. 3, and through which the gas to be treated is delivered to said cells. The opposite or left-hand end of said cell communicates with the same end of the second or next adjacent cell by means of perforations or apertures 8 in the partitions 5 between said cells. The second cell or compartment has communication with the third cell or compartment at its right-hand end by similar perforations $8^a$ in the partition 5 between said second and third cells, and the third and fourth cells or compartments have communication with each other through the left-hand end by apertures $8^c$, &c.

The partition 4 is perforated, as at 9, over one end of the upper or last cell or compartment 6, said apertures forming communication between the upper and lower chambers. The chamber above the partition 4 is similarly divided by suitable partitions 10 into cells or compartments 11, and I prefer to arrange said partitions 10 and the partitions 5 as shown best in Fig. 3.

The various cells or compartments 11 are connected together by apertures 12 through the partitions, so that in passing through said upper chamber gas has to pass through all of the various cells in succession.

14 designates the discharge-pipe connected with the last cell. Each of the lower cells or compartments 6 is filled with a suitable absorbent material, which is saturated with some hydrocarbon oil.

In the best form of my invention now known to me I prefer short lengths of cord or rope 15, as seen in Fig. 2, which are set on end in the cells and arranged adjacent each other.

I have found from practice that the best results are obtained by making the cord or rope of the following materials— to wit, manila hemp, strips of loosely-woven cloth, such as crash, asbestos cord, and crushed or shredded wood fiber. These cords may be made either by making each strand thereof of the above-named materials or by making one strand of one material and another of another and then twisting said strands together. The hemp and crash are used in the rope because they are quick absorbents and readily take up the hydrocarbon oil, and the asbestos cord and crushed or shredded wood fiber are used because they give stiffness to the cord and being rather poor absorbents modify the action of the other materials and prevent the wicks from becoming too thoroughly saturated with the hydrocarbon.

The object in employing wicks in rope form is to provide a packing material for the chambers which will not settle or suck down after use.

If the packing material were merely loosely laid in the chambers, it would after some time settle away from the upper side of the chambers, and thus make a free and uninterrupted passage for the gas above said material. This would defeat the purpose of the device, for the gas would pass therethrough, being thoroughly atomized or taking up the proper amount of the hydrocarbon.

During the passage of gas through the device the various lengths of cord 15 are to be saturated with some hydrocarbon, and in this embodiment of my invention I have accomplished this by partially filling the lower chamber with such oil. The various lengths of cord or rope 15 therefor set in a small body of oil and pick up the oil and become thoroughly saturated with it by capillary attraction, the same as the wick of an ordinary lamp.

For supplying the oil I have illustrated a suitable oil reservoir or chamber 17, which is connected to the lower end of the casing 3 by a suitable supply-pipe 18, said chamber 17 being so placed as to maintain the level of the oil in the lower chamber about at the dotted line a, Fig. 2.

The oil-reservoir 17 may be placed in any suitable position either in the same room where the casing 3 is or in an adjoining room, it only being necessary that it be properly placed to maintain the requisite oil-level. In this form of my invention I have illustrated it as provided with a supply-pipe 20, by means of which oil may be delivered thereto.

The upper cells or compartments 11 are filled with a suitable filtering material, which has for its function to remove any surplus matter absorbed by the gas in its passage through the lower cells or compartments 6. I have found by experience that short lengths of cord or rope 23 formed from wood fiber and asbestos answer the purpose well.

The inlet-pipe 7 and outlet-pipe 14 are each provided with suitable valves 24 and are connected by a by-pass 25, having a valve 26 therein.

The operation of the device is as follows: The valves 30 in the pipe 18 are opened and oil allowed to flow from the reservoir 17 into the lower chamber of the vessel 3 until it stands at about the level of the line a, Fig. 2. If the valves 24 are opened and valve 26 closed, the gas which is to be enriched or treated will enter through the inlet-pipes 7 and pass through one compartment 6 after the other until finally it is discharged through the openings 9 into the first of the compartments or cells 11, from whence it passes through the successive cells 11 and is finally discharged through the outlet-pipe 14. The cords or ropes 15 act as wicks and become thoroughly saturated with the hydrocarbon oil. The gas in passing through the successive cells or compartments 6 is obliged to filter through the pores and interstices in the saturated wicks 15, and thus becomes thoroughly atomized. During this process it absorbs or picks up hydrocarbon oil from the wicks 15, and thus becomes enriched. As the enriched gas passes into and through the upper cells or compartments 11 it becomes dried by its filtration through the packing material 23, and any excess of hydrocarbon is taken from it. The atomization of the hydrocarbon liquid in the lower compartment 6 cools the apparatus and the gas therein, and consequently the gas is contracted or reduced in volume. As soon as the gas is delivered from the apparatus it immediately expands in the service-pipe, and thus subsequent condensation and carbonization of the pipes is avoided. If the gas being treated is ordinary illuminating-gas, the process of treatment which it undergoes in the apparatus greatly enriches its illuminating quality. If the ordinary heating-gas is treated by means of my apparatus, not only is its heating power increased by the addition of more carbon, but its illuminating power is also increased, so that it is possible to take ordinary heating-gas and by passing it through my improved apparatus convert it into illuminating-gas of good quality. If air is passed through my improved apparatus, it becomes carbureted by the absorption of hydrocarbon gas from the wicks 15.

Other uses to which my invention may be applied will readily suggest themselves to those skilled in the art.

The degree to which the gas is enriched may be controlled by means of the by-pass 25. If the gas is to be enriched to the maximum, the valve 26 will be closed so that the entire stream of gas has to flow through the apparatus. If, on the other hand, it is desired to enrich the gas only slightly, the valve 26 will be partially opened, so that part of the current of gas will pass directly from the inlet-pipe 7 to the exhaust-pipe 14 and only a portion of the gas to be treated pass through the apparatus. This portion of enriched gas upon commingling with the gas in its normal state in the discharge-pipe 14 makes a gas which is partially enriched.

41 designates a pipe connecting the interior of the casing 3 with the oil-reservoir 17. This pipe has for its object to equalize the pressure in the oil-reservoir and the receptacle 3. 42 designates a vent-pipe connected to the reservoir to be opened while the reservoir is being filled.

While I have shown one form of apparatus embodying my invention, I wish it understood that the invention may be embodied in other forms of apparatus, and therefore that a good many changes in the construction of details of the device may be made without in any way departing from the invention.

Having described my invention, what I claim as new, and desire to secure by Letters Patent, is—

1. In a device of the class described, a casing having two chambers each divided into a plurality of compartments, wicks in rope form, made of hemp, crash, asbestos and wood fiber, in the compartments of one chamber, other wicks also in rope form and made of wood fiber and asbestos in the compartments of the other chamber, means to admit hydrocarbon oil to the compartment of the first chamber, a gas-inlet to said chamber, and a gas-outlet from the second chamber, the last compartment of the series in the first chamber having communication with the first compartment of the series of the second chamber.

2. In a device of the class described, a casing divided by a partition into two chambers each having a sinuous passage, said partition having openings forming a communication between said passages, a packing made of hemp, crash, asbestos, and wood fiber filling the passage in one chamber, a packing of wood fiber and asbestos filling the other chamber, means to admit hydrocarbon oil to the first chamber, a gas-inlet to said chamber, and a gas-outlet from the second chamber.

3. In a device of the class described, a receptacle provided with a horizontal partition forming an upper and lower chamber, partitions dividing each chamber into compartments which are connected together successively, wicks in rope form made of hemp, crash, asbestos and wood fiber in the compartments of the lower chamber, and of wood fiber and asbestos in the upper chamber, means to admit hydrocarbon oil in the compartments of the lower chamber, the last compartment of the series of the lower chamber communicating with the first compartment in the series in the upper chamber, and means to admit gas to the lower chamber and discharge it from the upper chamber.

In testimony whereof I have signed my name to this specification in the presence of two subscribing witnesses.

ROBERT S. LAWRENCE.

Witnesses:
 LOUIS C. SMITH,
 NATHAN HEARD.